UNITED STATES PATENT OFFICE.

HENRY WILLIAM HEMINGWAY, OF HAMPSTEAD, ENGLAND.

PROCESS FOR TREATING STONE AND LIKE MATERIAL.

1,067,426.  Specification of Letters Patent.  Patented July 15, 1913.

No Drawing.  Application filed December 5, 1911. Serial No. 664,469.

*To all whom it may concern:*

Be it known that I, HENRY WILLIAM HEMINGWAY, a subject of the King of Great Britain, residing at No. 9 Albemarle Mansions, Heath Drive, Hampstead, in the county of Middlesex, England, have invented new and useful Improvements in Processes for Treating Stone and Like Materials, of which the following is a specification.

This invention relates to a process of treating such materials as natural or artificial stone, chalk, stucco and similar substances which may be used for building and analogous purposes, with the object of preserving them or protecting them from the effects of weathering or otherwise rendering them more suitable for the purposes to which they are to be put.

The process is based on the reactions of arsenic acid with alkaline silicate (usually sodium silicate), by which silica is deposited in the pores of the material under treatment, or throughout the cement, and with the base or bases of the material to form an insoluble compound of great stability intimately mixed with the silica.

The treatment process involves two operations which may be carried out as follows:—

The surface of the material is washed over with a solution of arsenic acid, of a strength which may vary within wide limits according to the conditions. A solution of a specific gravity of 1.15 may be taken as suitable for ordinary purposes. The effect of this is to form an insoluble compound with the base of the material, and in the case of limestone or other carbonate, to drive off carbonic acid from the surface layer. The surplus acid not taken up by the base reacts with the second material, which is a solution of alkaline silicate washed over the already acidulated surface. The silicate is decomposed and free silica is deposited in the pores of the stone, where it hardens and protects the surface of the stone from attack by the acids of the atmosphere and rain. The alkaline compound formed and any surplus material can be washed off. The silicate should be sufficient to neutralize the remaining acid and I find that for solutions of equal density a volume of silicate solution equal to about three times the volume of the acid forms a suitable proportion for ordinary preservative work on the surface of stone and like material, but the best proportion varies somewhat with the depth of decay and other conditions.

When applied to solid surfaces, such as those of soot stained buildings, carvings, sculpture and the like, formed of material suitable for the application of my process, the process not only preserves the material from further attack by the atmosphere, but also cleanses it, the surface chemical action throwing off any sooty or other deposit and leaving the stone, stucco or other surface clean.

I may reverse the order of operations given above, and in the first place fill the pores of the material with a solution of alkaline silicate, then adding the arsenic acid, which must be in such quantities as to decompose the silicate and also to form an insoluble arsenate with the base of the stone.

The reaction involved may be illustrated broadly by the following equation:—

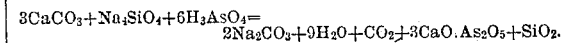

$$3CaCO_3 + Na_4SiO_4 + 6H_3AsO_4 = 2Na_2CO_3 + 9H_2O + CO_2 + 3CaO.As_2O_5 + SiO_2.$$

The calcium arsenate and the silica remain as insoluble materials while the carbonic acid escapes and the sodium carbonate can be removed by washing or left to be subsequently removed by the action of rain.

The treatment is applicable not only to building materials already in use, but may equally well be applied to stone and like material before building so as to render it more resistant and durable and also in some cases to extend its utility. Treated chalk, for example, may be colored and polished. The chalk treatment may be applied on a large scale in railway cuttings, on cliffs and in other situations where the chalk is liable to give way, owing to attack by water or weather. It is obvious that the process may also be applied to a variety of other purposes, and the above are given only as examples.

What I claim as my invention and desire to secure by Letters Patent is:—

1. A process for the preservative treatment of material containing a basic substance, consisting in the successive application of two solutions, one of alkaline silicate and the other of arsenic acid, whereby the acid deposits silica in the pores of the material and simultaneously forms an insoluble arsenate in intimate contact with the silica.

2. A process for the preservative treatment of material containing a basic substance, consisting in first filling the pores of the material to any desired depth with a solution of alkaline silicate and in then depositing the silica in the pores by a solution of arsenic acid in excess, which excess forms with the base of the material an insoluble arsenate in intimate contact with the silica.

In testimony whereof I affix my signature in the presence of two witnesses.

HENRY WILLIAM HEMINGWAY.

Witnesses:
  W. H. DORMER,
  JAS. BRAGG.

---

Copies of this patent may be obtained for five cents each, by addressing the "Commissioner of Patents, Washington, D. C."